June 13, 1944. W. E. CUMMINS ET AL 2,350,992
ELECTRO CHEMICAL VALUE RECOVERY APPARATUS
Filed Oct. 7, 1941 8 Sheets-Sheet 1

INVENTOR.
W. E. CUMMINS
W. W. STAPP
BY

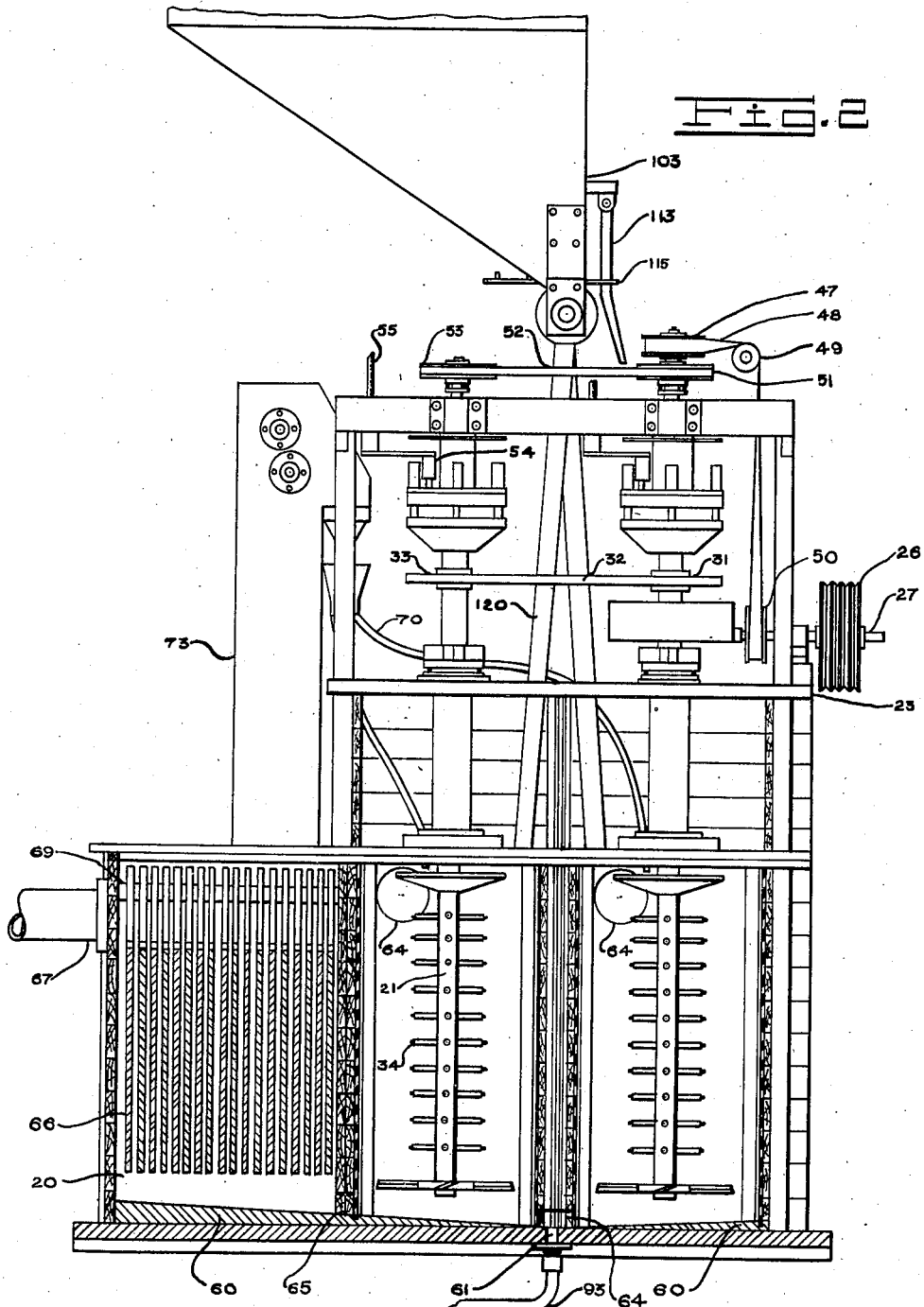

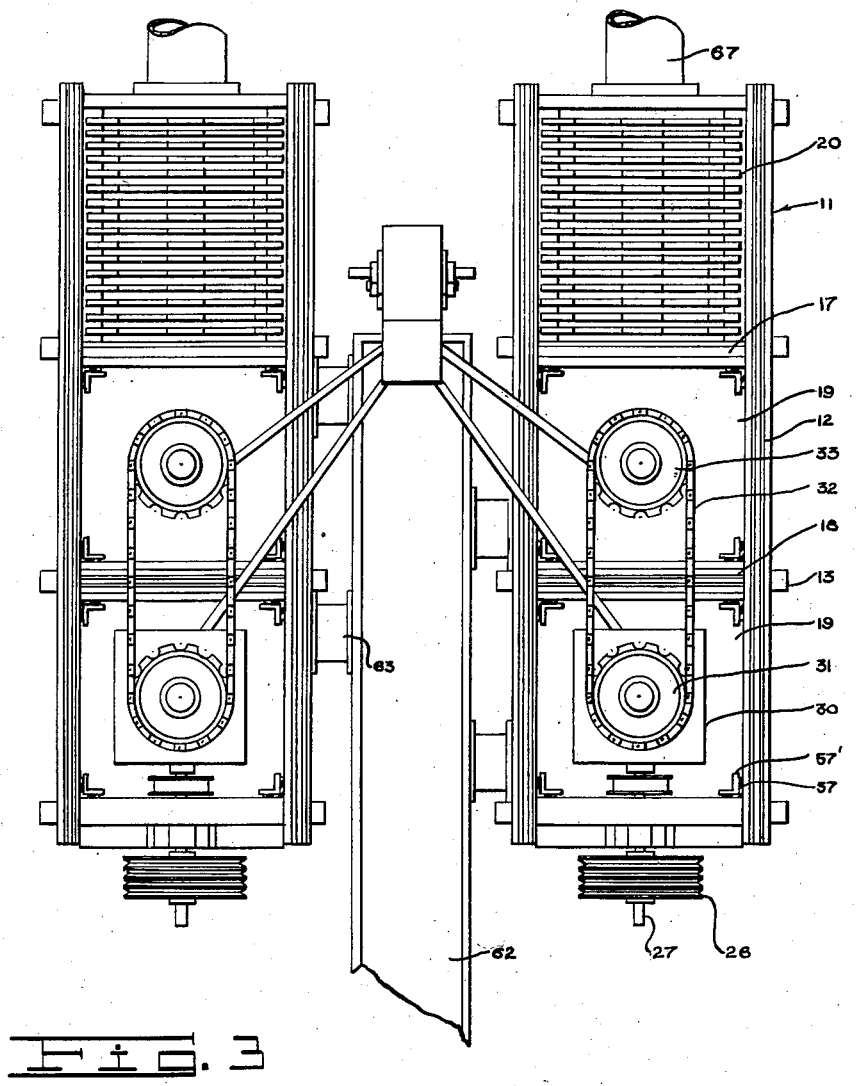

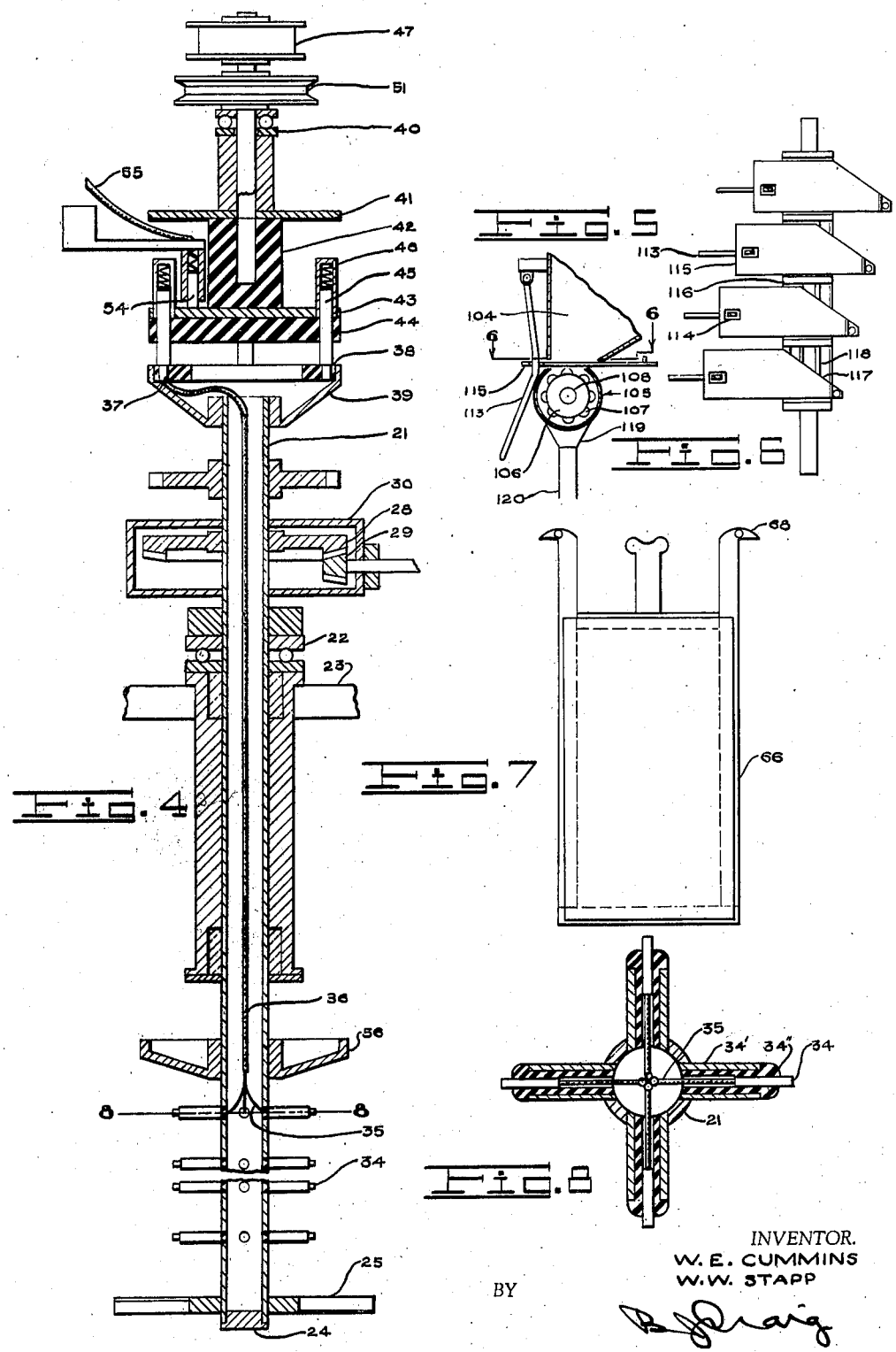

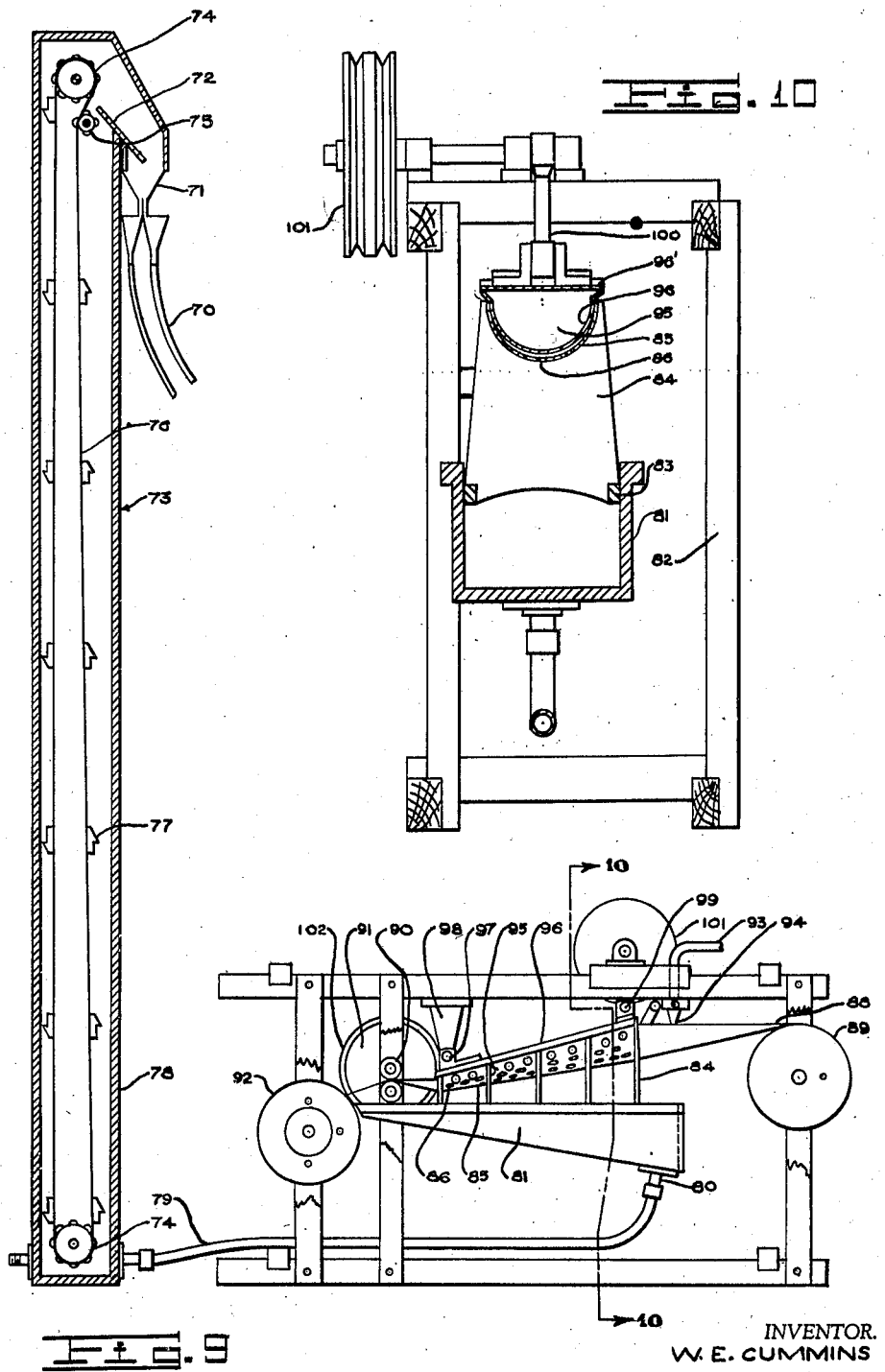

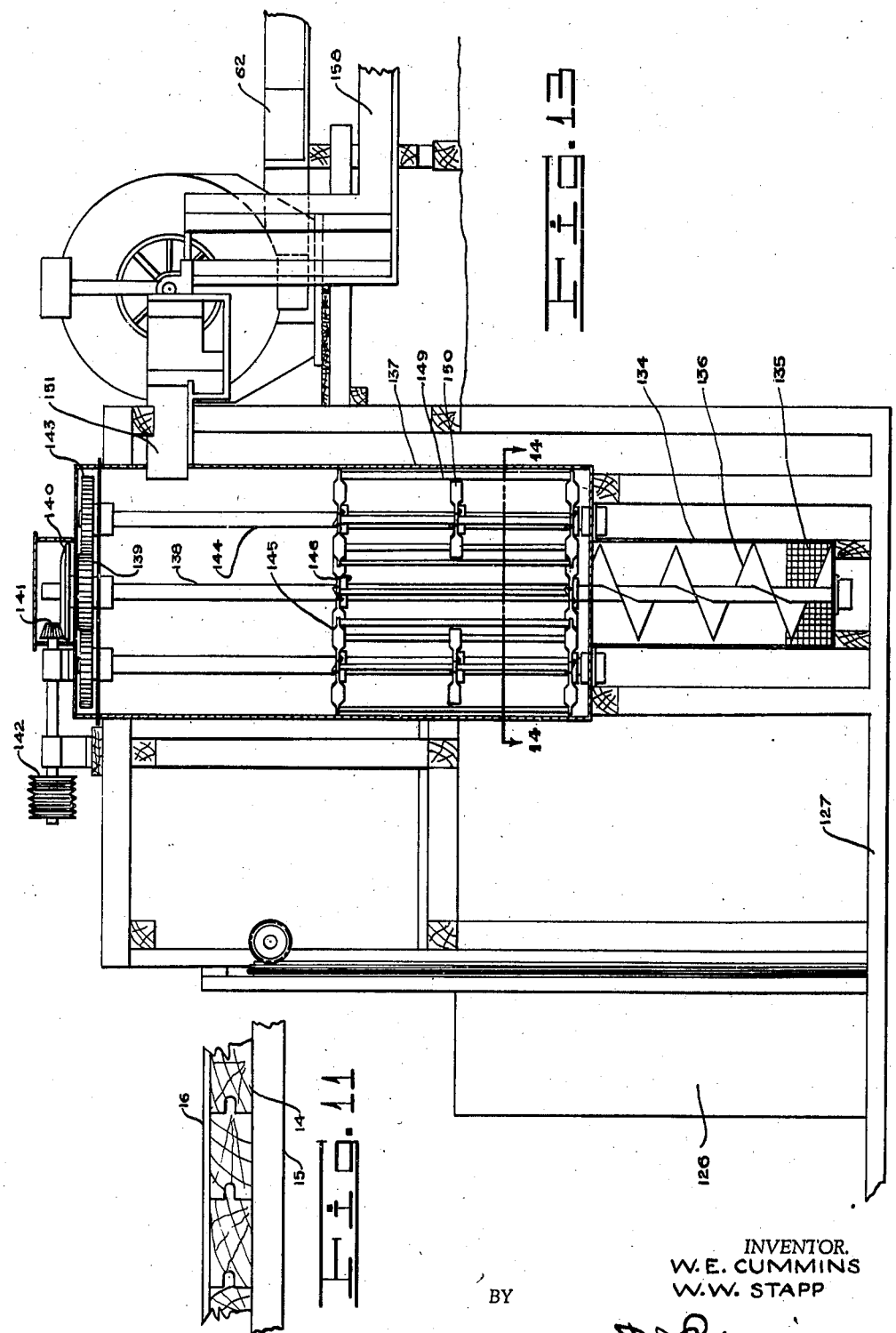

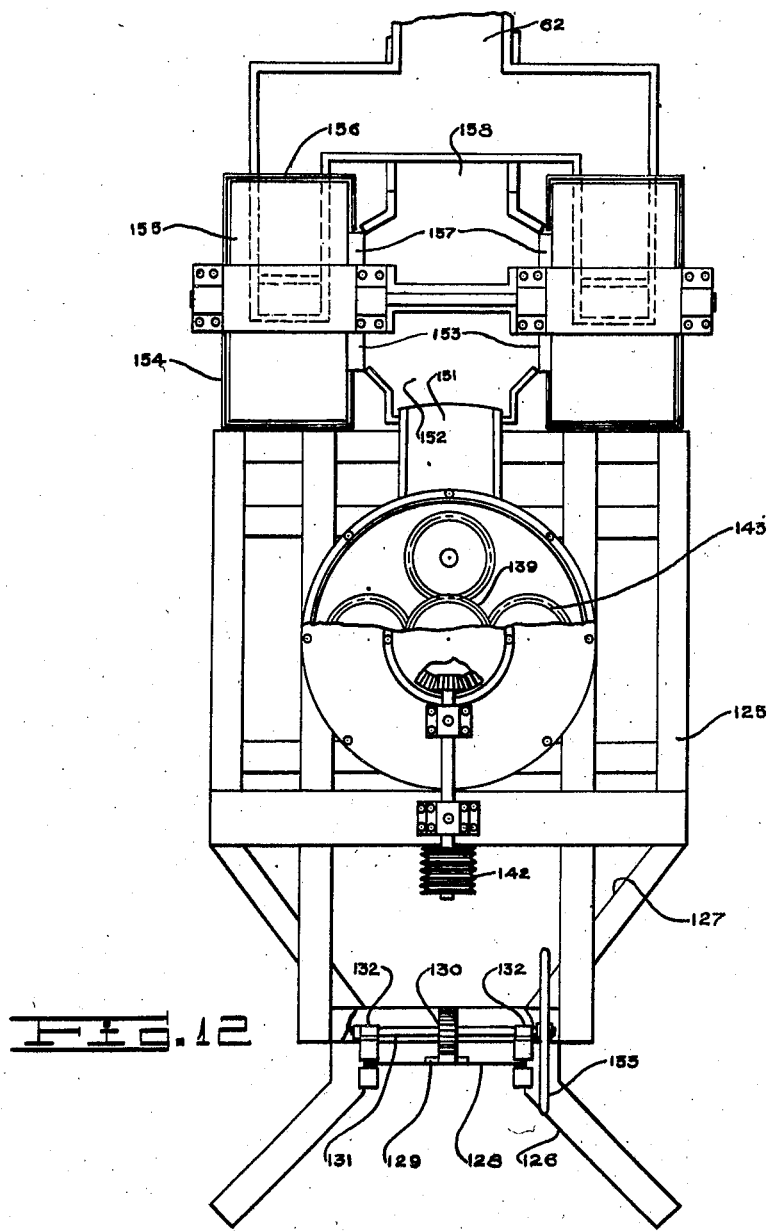

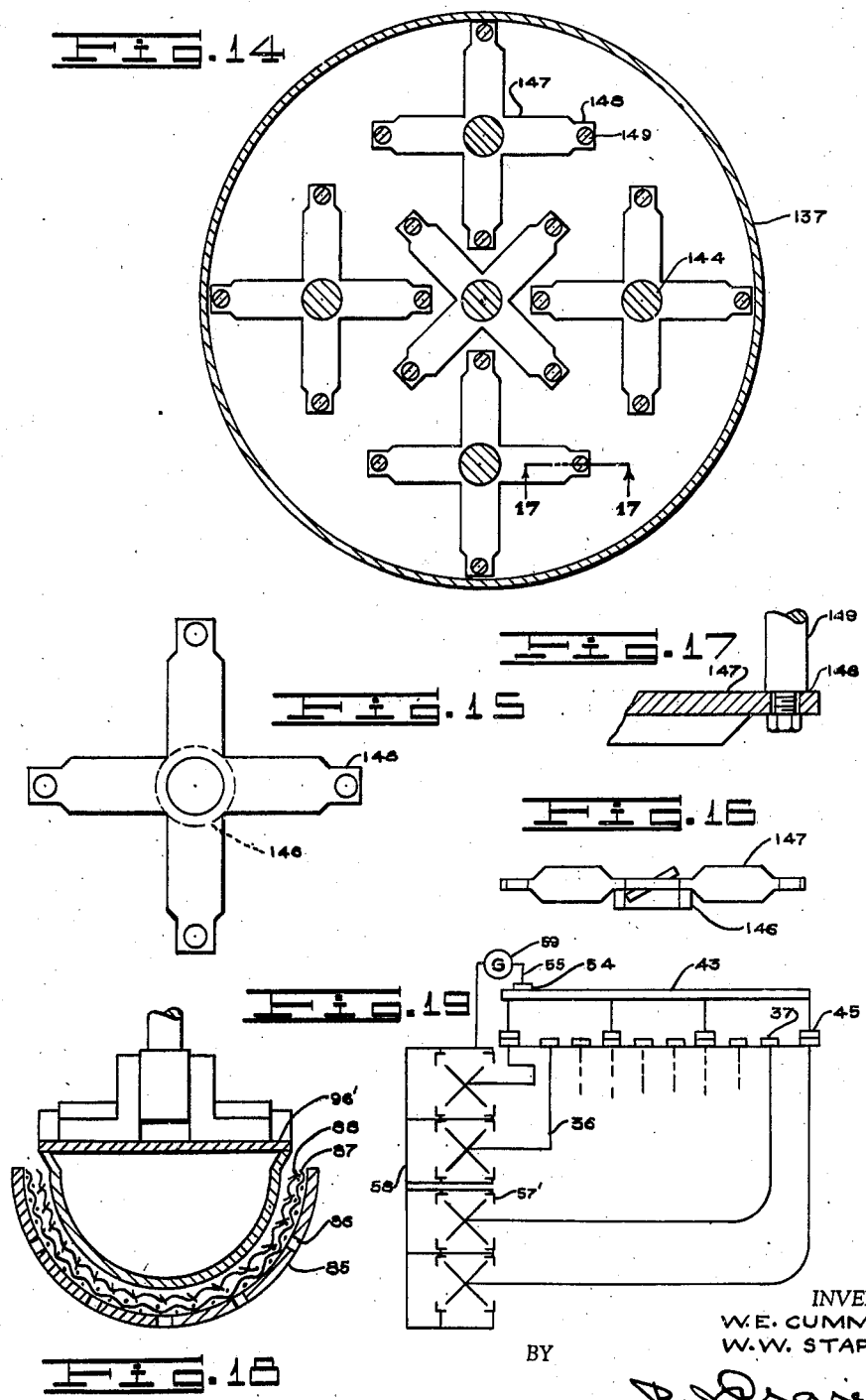

Patented June 13, 1944

2,350,992

UNITED STATES PATENT OFFICE 2,350,992

ELECTROCHEMICAL VALUE RECOVERY APPARATUS

Walter E. Cummins, Santa Maria, and Wallace W. Stapp, Long Beach, Calif.

Application October 7, 1941, Serial No. 413,946

7 Claims. (Cl. 209—179)

This invention relates to an electrochemical value recovering apparatus.

The general object of the invention is to provide a novel apparatus for use in the recovery of gold, mercury and other metals from sand, gravel or ore bearing rock.

Another object of the invention is to provide a novel bombardment apparatus for subjecting a value containing pulp to electrical bombardment.

Another object of the invention is to provide a novel means for controlling the flow of current to a pulp bombarding apparatus.

A further object of the invention is to provide a novel mercury supply means for use with a value recovering apparatus.

A further object of the invention is to provide a novel apparatus for controlling the flow of one or more chemicals to the treating receptacles of a value recovering apparatus.

Another object of the invention is to provide a novel filter cloth holder and value saver.

Another object of the invention is to provide a novel impeller pump and disintegrator unit for use with a value recovery apparatus.

A further object of the invention is to provide a novel compartmental receptacle for use with a value recovery apparatus.

In the recovery of gold and other precious metals from ore bearing deposits it frequently happens that the metals are surrounded by thin layers or films of a non-metallic nature and for this reason a satisfactory recovery is not made by the usual amalgamation process, and it is one of the objects of our invention to provide a novel apparatus and method for the recovery of values in materials of the nature mentioned.

In order to free the metals or the metallic salts which comprise the values we preferably first thoroughly disintegrate the material and form a pulp which is free from undesirable residue. This pulp is then subjected to a bombardment treatment preferably by a high voltage current which is rapidly pulsated to form electrical discharges which pass through the pulp.

To the bombarded pulp material we preferably add mercury and a reagent such as sodium chloride. The sodium chloride is broken down into sodium and chlorine and in the presence of the mercury the sodium forms an amalgam and the excess is discharged into the tailings as sodium hydroxide. The ores treated frequently contain salts of mercury and these are converted into metallic mercury. Gold, even when so finely divides as to be collodial, is recovered, as is silver e. g. from silver chloride. Due to the sodium excess most of the platinum group is recovered—also iridium, palladium, osmium, etc. in commercial quantities.

Large acreages of ore deposits suitable for our process occur in volcanic belts but due to the character of the values contained in such ore deposits their working has not been satisfactory, and as stated above it is one of the objects of our invention to provide a novel value recovery method and a novel apparatus which will accomplish the purposes mentioned.

Other objects and advantages of our invention will be apparent from the following description taken in connection with the accompanying drawings, wherein:

Fig. 2 is a central sectional view with parts in elevation showing one of the containers;

Fig. 3 is a top plan view of the apparatus with the reagent bin removed;

Fig. 4 is a central sectional view on an enlarged scale showing the rotating electrode supporting member and its drive means;

Fig. 5 is a fragmentary section with parts in elevation showing the lower position of the reagent bin;

Fig. 6 is a section taken on line 6—6 of Fig.5;

Fig. 7 is a side elevation showing one of the amalgam plates;

Fig. 8 is an enlarged section taken on line 8—8, Fig. 4;

Fig. 9 is a side elevation, partly in section and with parts broken away showing the value saver;

Fig. 10 is a section taken on broken line 10—10, Fig. 9;

Fig. 11 is a fragmentary section showing a modified wall construction;

Fig. 12 is a top plan view of the pump and disintegrator unit;

Fig. 13 is a side elevation, partly in section showing the pump and disintegrator unit;

Fig. 14 is a section taken on line 14—14, Fig. 13;

Fig. 15 is a top plan view of a disintegrator vane;

Fig. 16 is a side elevation of a disintegrator vane;

Fig. 17 is a fragmentary section taken on line 17—17, Fig. 14;

Fig. 18 is an enlarged sectional view showing the value saver; and

Fig. 19 is a wiring diagram.

Figure 1:
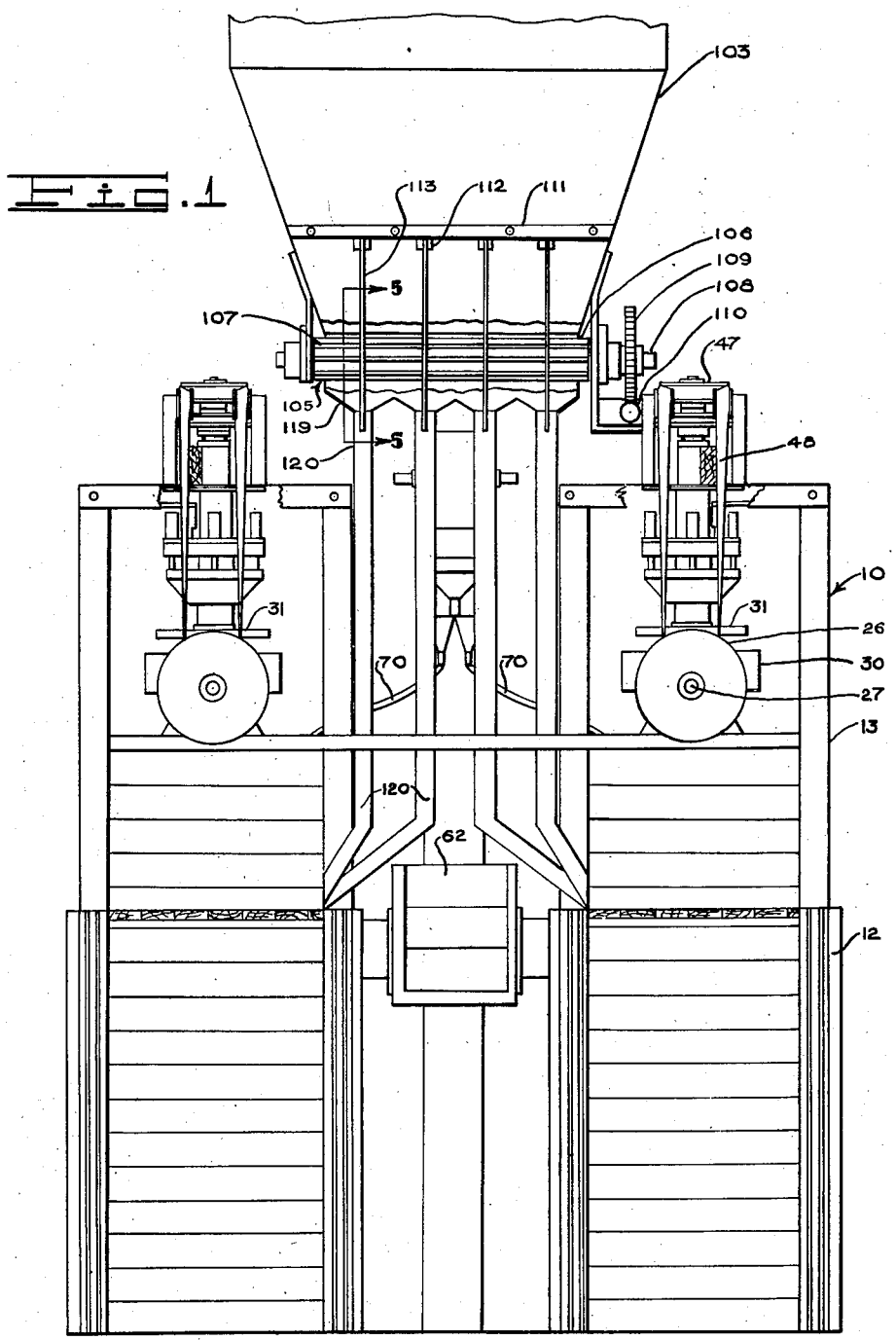
Fig. 1 is a front view with parts broken away showing our apparatus.

Referring to the drawings by reference character, we have shown our invention as embodied in an electrochemical value recovering apparatus which is indicated generally at 10.

As shown, the apparatus includes a pair of containers 11 which are arranged in side by side parallel relation and are spaced apart. Each of the containers 11 includes sides, ends and a bottom. The containers are preferably made of a plurality of layers of wood 12 and a supporting frame 13.

Instead of making the containers of plywood we construct them of wood planks indicated at 14 in Fig. 11. If the container is made in this fashion, it will be provided with support members 15 and with a lining of insulating plastic 16.

As shown, each container 11 is provided with partitions 17 and 18 which provide a pair of receptacles 19 and a chamber 20.

In each receptacle 19 we arranged a hollow tubular member 21 (see Fig. 4). Each tubular member includes an upper bearing support 22 which is suspended from a frame member 23. The lower end of the tubular member is shown as closed by a plug 24 and at the lower end each tubular member is provided with a vane member 25 the vanes of which are arranged to draw the pulp being treated downwardly in the associated receptacle.

One of the tubular members 21 in each set is driven from a pulley 26 on a shaft 27 through gears 28 and 29 arranged in a gear box 30 and the other tubular member of the same set is driven by a gear 31, sprocket chain 32 and gear 33.

At its lower end each of the tubular members 21 is provided with a plurality of sets of electrodes 34. These electrodes are shown as arranged in tubes 34' and are insulated from the tubes by insulating members 34''. The electrodes in each set are connected by leads 35 to a cable 36 and each of the cables 36 is connected to a contact 37 mounted in an insulating disk 38. The insulating disk 38 is mounted in a cup 39 secured upon the upper end of the tubular member 21.

Above each tubular member 21 we arrange bearings 40 which support a rotary member 41 which is connected by an insulating member 42 to a conducting plate 43. Below the conducting plate 42 we arrange an insulating disk 44. A plurality of contact pins 45 slide through the plate 43 and disk 44 and are urged by springs 46 into engagement with the contacts 37. We show four of the contact pins 45 although the number may be varied.

One of the rotary members 41 of each set is driven through a pulley 47 from a belt 48 which passes over an idler 49 and over a pulley 50 on the shaft 27. The rotation of the member 41 is preferably reverse to that of the tubular member 21. The other member 41 of each set is driven by a pulley 51 through a belt 52 and a pulley 53. Each of the conducting plates 43 is connected by a brush member 54 with a lead 55.

Above the uppermost set of electrodes 34, we arrange a cup member 56 which serves as a guard.

In the corner of each of the receptacles 19 we arrange insulating members 57 on which terminal bars 57' are mounted. The terminal bars are spaced from the ends of the electrodes 34.

Each of the bars 57' is connected by a lead 58 to one side of a suitable source 59 of electricity and the other side of the source is connected to the lead 55.

When the pulleys 26 on the shaft 27 are drawn by a suitable prime mover (not shown) the tubular members 21 will be rotated in one direction and the members 41 will be rotated in a reverse direction. As the members thus rotate current will pass to the lead 55, to the brush 54, plate 43, pins 45, contact 38 and lead 36, lead 35 to the electrode 34 and will jump across to the bars 57'. This action will occur rapidly so that a rapidly pulsating electrical discharge will be provided in the receptacles 19.

The containers 11 are provided with bottom members 60 which slope towards a drain 61. Pulp is conducted to the receptacles 19 from a launder 62 and passes through outlets 63 in the launder, and through openings 64 in the receptacle walls. The pulp passes downwardly in the receptacles and as it does this, it is subjected to electrical bombardment, as previously described. The pulp is directed downwardly by the vane members and passes through an opening 64 which connects the receptacles of each pair. The pulp is then forced through an opening 65 into the amalgam chamber 20, where it passes upwardly between amalgam plates 66 and through a waste outlet 67. The amalgam plates are of a character suitable for the purpose and we preferably provide them with ears 68 which engage support members 69 to hold them in place.

During the recovery operation, mercury is supplied to each receptacle from a tube 70 which extends from a hopper 71. The hopper 71 receives mercury from a discharge station 72 of a mercury elevator which is indicated generally at 73. The elevator includes spaced sprockets 74 and an idler 75 over which a suitable chain belt structure 76 passes. The belt 76 includes buckets 77 which pick up mercury at the bottom of a housing 78 in which the belt operates and discharges the mercury at the discharge station 72. Mercury is supplied to the bottom of the housing 78 through a pipe 79 connected to a drain 80 at the lower end of an inclined trough member 81.

The trough 81 is supported on a frame 82 and in the trough we show parallel bars 83 on which supports 84 are mounted. These supports are spaced apart and engage an arcuate downwardly inclined base member 85 of a value saver. The base member is provided with holes 86 and supports a screen 87 over which a filter cloth 88 passes. The filter cloth is wound upon a reel 89 and is pulled over the base member screen by feed rollers 90 which are driven from a member 91. The member 91 in turn through a suitable friction drive drives a reel 92 on which the filter cloth with the values thereon is wound.

The drain 61 which drains mercury from the bottom of the receptacles and containers is connected to a pipe 93 which communicates with a discharge spout 94. The spout 94 delivers the mercury onto the filter member 88.

To force the mercury from the filter cloth, we provide a pressure pad 95 which has a lower surface 96 substantially corresponding to the surface of the base member 85 and has a top 96'. The pressure pad is pivoted at one end as at 97 to a bracket 98 and at the other end is pivoted at 99 to an eccentric member 100 which is driven from suitable pulleys 101.

The construction is such that as the pulley 101 rotates the pressure pad 96 is moved down with great force so that the mercury is squeezed from the filter cloth and passes to the trough 81 whence it passes to the mercury saver 73. The values pass along with the cloth and are wound onto the reel 92. The feed rolls 90 are driven very slowly so that the filter cloth moves at a slow rate. The reel 92 is driven through a friction disk 102 on the member 91 so that slack is prevented in the filter cloth.

In the extraction of values from certain ore bodies it is desirable to add one or more reagents during the processing operation. For instance, in treating certain material with our apparatus we add sodium chloride to the pulp. In order to add such material we provide a storage bin 103 which is provided with a discharge portion 104. Below this discharge portion 104 we provide a measuring valve member indicated generally at 105 and which consists of a cylinder 106 having peripheral, spaced, longitudinally extending ribs 107 thereon. The member 106 is mounted on a shaft 108 which has a gear 109 thereon which is driven from a suitable drive gear 110 by means not shown.

Mounted on the hopper 103 is a bar 111 which has pairs of spaced ears 112 thereon. Between each pair of ears we pivot a control arm 113 which passes loosely through an aperture 114 in a valve plate 115. The lower portion of the hopper 103 is provided by partition forming member 116 between which the plates 115 slide. The plates 115 are provided with beveled ends 117 and as the plates are withdrawn, they provide discharge passages 118 to the cylindrical feed member 106 so that the amount of material passing to the feed members may be adjusted. Below the feed members we provide discharge chutes 119 each of which leads to a conduit 120 and each of the discharge conduits 120 is arranged to discharge salt or other material to one of the receptacles 19.

In Figs. 12 to 17 we show our impeller pump and disintegrater unit which includes a suitable housing 125. The housing includes an entrance portion 126 which leads to a chamber 127. Communication between the parts 126 and 127 is controlled by a suitable gate member 128 on which a rack 129 is arranged. The rack 129 is engaged by a gear 130 which is supported on a suitable shaft 131 mounted in suitable bearings 132. A hand wheel 133 serves to rotate the shaft and thereby raise and lower the gate 128.

In advance of the chamber 127 we arrange a screw impeller cylinder 134 which includes a screened lower portion 135 and in which a spiral impeller member 136 is mounted. This impeller may be of any desired pitch and construction although we prefer that a 22° pitch be employed.

Above the cylinder 134 we provide a disintegrator chamber 137 in which a central shaft 138 is arranged. On the shaft 138 we arrange a gear 139 and on the same shaft we arrange a beveled gear 140 which is driven by a bevel pinion 141 from a pulley 142. The gear 140 meshes with four gears 143 which are disposed 90° apart and each of the gears 143 is mounted on a shaft 144 which extends to the bottom of the chamber 137 and is there supported by a suitable bearing 144.

On the shafts 138 and 144 we arrange a plurality of spiders or vanes 145. These spiders include hub portions 146 and radial vanes 147 which are inclined as shown. At the ends the vanes include ears 148 which are apertures to receive rods 149. Intermediate the spiders 145 we provide a spider 150 which is similar to the other spiders mentioned except that the ears are omitted.

The spiders are arranged in the position shown in Fig. 14 with the spiders on the shaft 144 all in phase and with the spiders on the shaft 138 disposed between the other spiders. The construction is such that when the shaft 138 is rotated the spiders acting in conjunction with the rods 149 provide a centrifugal agitating effect which thoroughly disintegrates the material being treated.

From the chamber 137 the disintegrated material passes through an outlet 151 and into a chamber 152 whence it diverges into two streams and passes through inlets 153 into housings 154 in which rotary washer members 155 are arranged. These washer members may be of any suitable type and serve to separate the sand, silt and gravel and other impurities. These washers are in the nature of mud screens and the pulp containing values passes from the washers through outlets 156 and passes into the launder 62 as shown. The waste material from the mud screen passes through the waste outlet 157 to a waste chute 158.

In the use of our apparatus the material to be returned passes through the entrance portion 126 of the disintegrater past the gate valve 128 through the chamber 137 and is lifted by the spiral member 136 to the chamber 127. In this chamber the vane members 145 and the rods 149 thoroughly break up the material. The material from the chamber 137 passes to the debris washer 155 (the constructions of which forms no part of the present invention).

The part containing the values passes into the launder 62 and through the outlet 63 and opening 64 into the receptacle 19. The material passes down through the receptacle with the circulation assisted by the vane members 25 and during this movement the material is treated with mercury supplied by the tube 70 and by sodium chloride through the conduits 120. In the receptacle 19 the material is subjected to a severe electrical bombardment so that the particles are freed from the coating, etc. and the various actions mentions above take place.

The material passes through the amalgam chambers 20 where a further recovery of value takes place. The mercury drains down from the receptacle 19 into the chamber 20 and passes through the pipe 93 to the value saver and onto the filter cloth 88 where it is subjected to the pressure treatment mentioned so that the cloth with the values therein passes on to the reel 92 and the mercury is returned through the pipe 79 to the mercury elevator 73 and back into the circuit.

Certain of the material which may be treated by our improved method and apparatus includes compounds of mercury and during this operation free mercury is secured so that after the initiation of the process there is an excess of mercury available which may be withdrawn and shipped to consumers.

The values are recovered from the cloth 88 on the reel 92 and from the amalgam plates in the usual approved manner.

From the foregoing description it will appear that we have invented a novel electrochemical value recovery apparatus and method which is highly effective for its intended purpose.

Having thus described our invention, we claim:

1. A value recovering apparatus comprising an elongated container, a partition means in the container providing a plurality of receptacles and an amalgam chamber, said receptacles having closed bottoms, means to supply pulp to each receptacle, a vertically arranged rotary member in each receptacle, a plurality of electrodes on each rotary member, means to drive said rotary members, means on the rotary members to urge pulp downwardly in each receptacle, means adjacent the lower part of the container to afford communication between the receptacles and the chamber, said amalgam chamber having an outlet adjacent to the top thereof, a plurality of amalgam plates in the chamber, a normally open drain in the container, said receptacle and chamber bottoms sloping to the drain, means to supply mercury to each receptacle, and means to supply a chemical agent to each receptacle.

2. A value recovering apparatus comprising an elongated container having side walls and end walls, partition means in the container providing a plurality of receptacles and a chamber, a frame member extending above said receptacles, a drive member supported on said frame member, a plurality of vertical shafts arranged on said frame member and extending into said receptacles, a plurality of electrodes arranged on each shaft, means whereby said drive member drives said shafts, a reagent receptacle supported on said frame member, conduit means connecting said reagent receptacle and said first mentioned receptacles, a rotary member in said conduit for controlling discharge from said reagent receptacle and means whereby said drive member drives said rotary member.

3. A value recovering apparatus comprising an elongated container, partition means in the container providing a plurality of receptacles and an amalgam chamber, said receptacles having closed bottoms, means to supply pulp to each receptacle, a vertically arranged rotary member in each receptacle, a plurality of agitators on each rotary member, means to supply a reagent to each receptacle, a drive means, means operated by the drive means to operate said rotary member and said supply means, means on the rotary members to urge pulp downwardly in each receptacle, means adjacent the lower part of the container to afford communication between the receptacles and the chamber, said amalgam chamber having an outlet adjacent to the top thereof, a plurality of amalgam plates in the chamber, a normally open drain in the container, said receptacle and chamber bottoms sloping to the drain, means to supply mercury to each receptacle, and means to supply a chemical agent to each receptacle.

4. In a value recovering apparatus, a receptacle, an amalgam chamber, said receptacle having a closed bottom, means to supply pulp to the receptacle, a vertically arranged rotary agitating member in the receptacle, means to drive said rotary agitating member, means to afford communication between the receptacle and the amalgam chamber, said amalgam chamber having an outlet adjacent to the top thereof, a plurality of amalgam plates in the chamber, and a continuously open drain in the receptacle, said receptacle bottom sloping to the drain, and means to supply mercury to the receptacle.

5. In a value recovering apparatus, an elongated container, partition means in the container providing a receptacle and an amalgam chamber, said receptacle having a closed bottom, means to supply pulp to the receptacle, a vertically arranged rotary agitating member in the receptacle, means to drive said rotary member, means on the rotary agitating member to urge pulp downwardly in the receptacle, means adjacent the lower part of the container to afford communication between the receptacle and the amalgam chamber, said amalgam chamber having an outlet adjacent to the top thereof, a plurality of amalgam plates in the chamber, a continuously open drain in the receptacle, said receptacle and chamber bottom sloping to the drain, and means to supply mercury to the receptacle.

6. A value recovering apparatus comprising an elongated container, partition means in the container providing a receptacle and an amalgam chamber, said receptacle having a closed bottom, a vertically arranged rotary member in the receptacle, a plurality of radially arranged electrodes on the rotary member, means to drive said rotary member, means adjacent the lower part of the container to afford communication between the receptacle and the chamber, said amalgam chamber having an outlet adjacent to the top thereof, an amalgam plate in the chamber, a normally open drain in the container, said receptacle and chamber bottoms sloping to the drain, means to supply mercury to the receptacle, and means to supply a chemical agent to the receptacle.

7. A value recovering apparatus comprising an elongated container, partition means in the container providing a receptacle and an amalgam chamber, said receptacle having a closed bottom, a vertically arranged rotary member in the receptacle, a plurality of agitators on the rotary member, means to supply a reagent to the receptacle, a drive means, means operated by the drive means to operate said rotary member and said supply means, means adjacent the lower part of the container to afford communication between the receptacle and the chamber, said amalgam chamber having an outlet adjacent to the top thereof, an amalgam plate in the chamber, a drain for the container, said receptacle and chamber bottoms sloping to the drain, means to supply mercury to the receptacle, and means to supply a chemical agent to the receptacle.

WALTER E. CUMMINS.
WALLACE W. STAPP.